United States Patent Office 3,145,074
Patented Aug. 18, 1964

3,145,074
ISOCYANATE TREATMENT OF WOOL IN PRESENCE OF METHYLPYRROLIDONE
Nathan H. Koenig, Berkeley, and Rosa A. Crass, Oakland, Calif., assignors to the United States of America as represented by the Secretary of Agriculture
No Drawing. Filed Oct. 2, 1962, Ser. No. 227,961
8 Claims. (Cl. 8—127.6)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates broadly to the chemical modification of wool by reacting it with an organic isocyanate. In particular, the invention concerns and has as its prime object the provision of processes wherein the reaction of wool with organic isocyanates is conducted in the presence of N-methyl-2-pyrrolidone, hereafter referred to as methylpyrrolidone, whereby to facilitate and promote the said reaction. Further objects and advantages of the invention will be apparent from the following description wherein parts and percentages are by weight, unless otherwise specified.

Prior to this invention it has been advocated that wool be modified by applying an organic isocyanate to the wool, followed by baking the isocyanate-impregnated wool in an oven. In another technique, the wool is heated with a solution of an organic isocyanate in an organic solvent such as benzene or carbon tetrachloride. Under these conditions only a minor amount of the isocyanate actually reacts with the wool so that the degree of modification is low.

In accordance with the present invention, wool is reacted with an organic isocyanate in the presence of methylpyrrolidone. The latter compound catalyzes the actual chemical combination of the wool and the isocyanate reactant. As a result, one is enabled to readily prepare wools containing substantial proportions of combined isocyanate and having correspondingly improved properties. The modified wool products so prepared exhibit increased resistance to acids, alkalis, and other reagents which degrade normal wool.

The unusual and effective action of methylpyrrolidone as a catalyst for the reaction of isocyanates with wool is exemplified by the following comparative tests: (a) dry wool (1.4 g.) and phenyl isocyanate (5 ml.) were heated at 105° C. for 15 minutes. The wool was extracted with warm acetone and hot ethanol to remove unreacted reagents and dried. It was found that the increase in weight of the wool was only 3%; (b) dry wool (1.4 g.) and methylpyrrolidone (5 ml.) were heated at 105° C. for 15 minutes. The wool was extracted as described above and dried. The increase in weight of the wool was only 2%; (c) dry wool (1.4 g.) was heated with phenyl isocyanate (2 ml.) and methylpyrrolidone (3 ml.) at 105° C. for 15 minutes. The wool was extracted as described above and dried. In this case, the increase in weight of the wool, due to reaction with isocyanate, was 32%.

The fact that methylpyrrolidone acts as a catalyst rather than a mere solvent is demonstrated by the following experimental data: Dry wool (1.2 g.), phenyl isocyanate (2 ml.), and methylpyrrolidone (4 ml.) were heated for 60 minutes at 115° C. The wool was extracted with acetone and ethanol to remove unreacted reagents and dried. It was found that the increase in weight of the wool, due to reaction with the isocyanate, was 38%. A series of experiments were then carried out under the same conditions but substituting for the methylpyrrolidone the same volume of the following solvents: butyl acetate, butyl ether, and xylene. In these runs, the increase in weight of the wool was only 2%.

In addition to the basic criterion that methylpyrrolidone has the ability to catalyze the reaction of wool with isocyanates, it has certain characteristics that make its use particularly advantageous for the reaction in question. Among these are a high boiling point (202° C.), a low vapor pressure, and a low order of toxicity. The high boiling point of the compound is advantageous in that the wool-isocyanate reaction can be conducted at high temperatures without requiring pressure-tight vessels or other special apparatus. The low vapor pressure of the compound is advantageous in reducing fire hazard. Further, methylpyrrolidone is a stable compound and does not react to any material extent with wool. In sum, the characteristics of methylpyrrolidone indicate that it is a very useful catalyst for the modification of wool with isocyanates.

Carrying out the process of the invention essentially involves contacting wool with an isocyanate in the presence of methylpyrrolidone. The reaction conditions such as proportion of reagents, specific isocyanate used, time, temperature, etc., are not critical but may be varied to suit individual circumstances without changing the basic nature of the invention. The proportion of methylpyrrolidone may be varied widely and may be as low as 0.1 volume per volume of isocyanate. In the case of isocyanates which are normally solid, the volume considered is that of the molten (liquefied) compound. Usually, it is preferred to use a larger proportion of methylpyrrolidone, i.e., about 0.2 to 5 volumes thereof per volume of isocyanate, to attain an increased reaction-promoting effect. The temperature of reaction may be about from 35° to 135° C. The reaction rate is increased with increasing temperature and a preferred temperature range to expedite the reaction without damage to the wool is 100–115° C.

It is preferred to carry out the reaction under anhydrous conditions, thereby to ensure reaction between the wool and the isocyanate and to suppress the formation of insoluble byproducts as mere coatings on the wool. The reaction can be applied to wool in its normal undried condition (containing about 12–14% water) but in such case, the chemical reaction between wool and isocyanate will be accompanied by formation of insoluble isocyanate reaction products which deposit on the wool fibers. The degree of modification of the wool is influenced by the proportion of isocyanate taken up by the fiber; that is, the higher the uptake of isocyanate the greater will be the modification of the wool. In general, the uptake of isocyanate may be varied about from 1 to 70% by weight. In conducting the reaction, the isocyanate reactant is generally employed in excess over the amount desired to be taken up by the fiber. The time of reaction will vary depending on the proportion of methylpyrrolidone, temperature of reaction, reactivity of the isocyanate selected, and the degree of modification desired. In general, the reaction may take anywhere from a few minutes to several hours.

The process in accordance with the invention may be carried out in various ways. For example, the wool may be directly contacted with the methylpyrrolidone and isocyanate reactant and the reaction mixture preferably heated as indicated above to cause the isocyanate to react with the wool. In the alternative, the wool may be pretreated with methylpyrrolidone and the isocyanate than added to the mixture and the reaction carried out as previously described.

After reaction of the wool with the isocyanate, the chemically modified fiber is preferably treated to remove excess isocyanate, methylpyrrolidone, and solvent, if such is used. Thus, the wool may be treated as by wringing, passage through squeeze-rolls, centrifugation, or the like to remove the excess materials. In place of such mechanical action, or following it, the product may be extracted with a solvent such as trichloroethylene, benzene, acetone, carbon tetrachloride, etc. Successive extractions with different solvents may be used to ensure complete removal of all unreacted materials. The treated wool is then dried in the usual way.

By treating wool with the isocyanate reagent as above described, the wool is chemically modified because there is a chemical reaction between the isocyanate and the protein molecules of the wool fibers. As a result, the modified wool exhibits many advantageous properties over normal wool, as illustrated below.

An outstanding feature is the increased resistance of the modified wool to acids as indicated by its decreased solubility in hot hydrochloric acid. This factor improves the usefulness of the modified wool in applications where the product comes into contact with acidic materials. For example, wool may encounter acid conditions during manufacturing processes such as carbonizing to remove burrs; dyeing in acid dye baths; and fulling with acid media. The more resistant the wool is to such acid environments, the greater will be its subsequent mechanical strength and wear-resistance.

In addition, wool frequently comes in contact with alkali in processes such as scouring, stripping and laundering. An advantageous feature of the invention is that the treated fabrics often are more resistant to alkali. Thus, the handle, strength, and durability of the modified wool is not impaired by alkaline environments. The increased resistance to alkali is illustrated by the lowered solubility of the modified wool in the alkali test described herein below.

The modified wool is also more resistant to oxidizing conditions. Such conditions may be encountered in textile mills during bleaching, shrinkproofing, or other finishing processes. Oxidizing environments also occur in use by the action of light and air, and in laundering by bleaching chemicals. Resistance to alkaline oxidizing conditions has been shown by exposure to sodium hypochlorite solutions which are commonly used as a commercial bleach.

The tendency of wool to shrink when subjected to washing in aqueous media has long been a deterrent to the more widespread use of wool. An important advantage of the invention is that it yields modified wools which have a decreased tendency to shrink when subjected to washing with conventional soap and water or detergent and water formulations.

Although the properties of the chemically modified wool indicate beyond question that actual chemical combination between the wool and the isocyanate has taken place, it is not known for certain how the wool and isocyanate moieties are joined. It is believed, however, that the isocyanates react with sites on the wool molecule where there are reactive hydrogen atoms—these include such groups as amino, hydroxyl, thiol, phenolic, amide, guanidino, imidazoyl, and carboxyl. When the reagent is a diisocyanate, it is believed that cross-linking also occurs, that is, protein molecules are joined to one another through the diisocyanate. It is to be particularly noted that the reaction in accordance with the invention does not impair the wool fiber for its intended purpose, that is, for producing woven or knitted textiles, garments, etc. Thus, at low and moderate isocyanate uptakes, the chemicale resistance of wool can be greatly improved without appreciably adversely affecting the tensile strength, hand, or color of the wool.

The process of the invention may be applied to wool in the form of fibers, as such, or in the form of threads, yarns, slivers, knitted or woven goods, felts, etc. The wool textiles may be white or dyed goods and may be of all-wool composition or blends of wool with other textile fibers such as cotton, regenerated cellulose, viscose, animal hair, etc.

The catalytic ability of methylpyrrolidone is not restricted to any particular isocyanate or class of isocyanates. Consequently, the invention may be applied in the reaction of wool with all types of organic isocyanates. Particularly preferred are the aliphatic, aromatic, or aromatic-aliphatic compounds containing one or more isocyanate groups. These compounds may be hydrocarbon isocyanates or may contain substituents on the hydrocarbon residue such as halogen (chlorine, bromine, iodine, and fluorine), ether groups, ester groups, nitro groups, etc. Examples of compounds coming within the purview of the invention are listed below by way of illustration and not limitation:

Typical examples of compounds in the category of aliphatic isocyanates are methyl isocyanate, ethyl isocyanate, propyl isocyanate, isopropyl isocyanate, butyl (normal, iso, secondary, or tertiary) isocyanate, amyl isocyanate, isoamyl isocyanate, hexyl isocyanate, octyl isocyanate, 2-ethylhexyl isocyanate, decyl isocyanate, dodecyl isocyanate, tetradecyl isocyanate, hexadecyl isocyanate, octadecyl isocyanate, cyclohexyl isocyanate, methylcylohexyl isocyanate, 2-chloroethyl isocyanate, 2-bromoethyl isocyanate, 2-iodoethyl isocyanate, 2-fluoroethyl isocyanate, 12-chlorododecyl isocyanate, 4-chlorocyclohexyl isocyanate, 2-methoxyethyl isocyanate, 2-ethoxyethyl isocyanate, 2-butoxyethyl isocyanate, carbethoxymethyl isocyanate, ethylene diisocyanate, propylene diisocyanate, butylene diisocyanate, trimethylene diisocyanate, tetramethylene diisocyanate, hexamethylene diisocyanate, octamethylene diisocyanate, decamethylene diisocyanate, cyclohexylene diisocyanate, bis (2-isocyanatoethyl) ether, bis (2-isocyanatoethyl) ether of ethylene glycol, 1-chloropropane-2,3,-diisocyanate, etc.

Typical examples of compounds in the category of aromatic isocyanates are phenyl isocyanate, o-tolyl isocyanate, m-tolyl isocyanate, p-tolyl isocyanate, xylyl isocyanate, alpha-naphthyl isocyanate, dodecylphenyl isocyanate, cyclohexylphenyl isocyanate, biphenlyl isocyanate, benzylphenyl isocyanate, o-chlorophenyl isocyanate, m-chlorophenyl isocyanate, p-chlorophenyl isocyanate, 2-5-dichlorophenyl isocyanate, p-bromophenyl isocyanate, o-methoxyphenyl isocyanate, p-methoxyphenyl isocyanate, o-ethoxyhenyl isocyanate, p-ethoxyphenyl isocyanate, m-nitrophenyl isocyanate, p-nitrophenyl isocyanate, o-phenylene diisocyanate, m-phenylene diisocyanate, p-phenylene diisocyanate, tolylene-2,4-diisocyanate, tolylene-2,6-diisocyanate, 3,3'-bitolylene-4,4'-diisocyanate, i.e.,

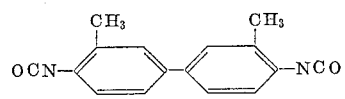

3,5,3',5'-bixylylene-4,4'-diisocyanate, i.e.,

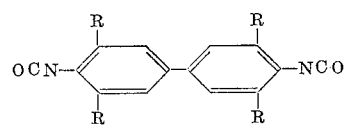

diphenylmethane-4,4'-diisocyanate, i.e,

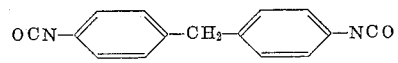

biphenylene - 4,4'-diisocyanate, 3,3'-dimethoxy-biphenylene-4,4'-diisocyanate, naphthalene diisocyanates, polymethylene polyphenyl isocyanates, etc.

Typical examples of aromatic-aliphatic isocyanates are benzyl isocyanate, chlorobenzyl isocyanates, methylbenzyl isocyanates, methoxybenzyl isocyanates, nitrobenzyl isocyanates, 2-phenoxyethyl isocyanate, 2-benzoxyethyl isocynate, etc.

The invention is further demonstrated by the following illustrative examples:

Example I

A series of runs was carried out wherein dry wool flannel was reacted with monoisocyanates in the presence of methylpyrrolidone. In these runs, the weight of dry wool was 1.4 grams, the volume of isocyanate was 2 ml., the volume of methylpyrrolidone was 3 ml., the temperature of the reaction was 105° C., and the reaction time was 60 minutes. The uptakes of the isocyanate are tabulated below.

| Isocyanate: | Uptake of isocyanate by wool, percent |
|---|---|
| Phenyl isocyanate | 39 |
| m-Tolyl isocyanate | 41 |
| o-Chlorophenyl isocyanate | 50 |
| Octadecyl isocyanate | 36 |

Example II

The acid solubility of modified wools produced in accordance with the invention and that of untreated wool were determined in the following way: The wool sample is immersed in 5 N hydrochloric acid for one hour at 65° C. The loss in weight of the sample is then determined after thoroughly washing the acid-soaked wool. The increased resistance of modified wools to hot hydrochloric acid is illustrated by the following data:

| Isocyanate | Uptake of isocyanate by wool, percent | Acid solubility, Percent |
|---|---|---|
| None (untreated wool) | 0 | 16 |
| m-Tolyl isocyanate | 21 | 3 |
| Octadecyl isocyanate | 25 | 4 |

Example III

An experiment was carried out to determine the resistance of the modified wools to the action of alkali by measuring their solubility in aqueous sodium hydroxide. In this experiment the modified wool sample was immersed in 0.1 N sodium hydroxide solution for one hour at 65° C. The loss in weight was determined after a thorough washing of the alkali-soaked wool with water. The results obtained are given below:

| Isocyanate | Uptake of isocyanate by wool, percent | Alkali solubility, percent |
|---|---|---|
| None (untreated wool) | 0 | 14 |
| m-Tolyl isocyanate | 21 | 7 |
| Octadecyl isocyanate | 25 | 7 |

Example IV

Tests were carried out as follows to determine the resistance of modified wool samples to alkaline oxidizing conditions. A 2-cm. length of yarn was removed from the fabric and placed in a 50-ml. beaker containing 20 ml. of 2.6% aqueous sodium hypochlorite. The liquid was stirred magnetically until the yarn had dissolved. The increased resistance of modified wools to sodium hypochlorite is illustrated by the data below:

| Sample | Treatment | Uptake of isocyanate by wool, percent | Time to dissolve yarn, min. |
|---|---|---|---|
| A | Untreated wool (8 oz./yd.²) used for samples B, C and D. | 0 | 3 |
| B | m-Tolyl isocyanate | 21 | 30 |
| C | o-Chlorophenyl isocyanate | 50 | *Over 30 |
| D | Octadecyl isocyanate | 25 | 17 |
| E | Untreated wool (10 oz./yd.²) used for sample F. | 0 | 4 |
| F | 3,5,3',5'-bixylylene-4,4'-diisocyanate | 23 | 21 |

*Yarn still intact after 30 minutes.

Example V

Tests were carried out to determine the improvement in shrinkage characteristics of the modified wools. The shrinkage tests were carried out as follows: The wool samples were milled at 1700 r.p.m. for 2 minutes at 40–42° C. in an "Accelerotor" with 0.9% sodium oleate solution, using a liquor to wool ratio of 50 to 1. After this washing operation, the samples were measured to determine their area. The improvement in shrinkage properties of wool modified in accordance with the invention is demonstrated by the following data:

| Isocyanate | Uptake of isocyanate by wool, percent | Area shrinkage, percent |
|---|---|---|
| None (untreated wool) | 0 | 33 |
| Phenyl isocyanate | 23 | 3 |
| m-Tolyl isocyanate | 41 | 0 |
| Octadecyl isocyanate | 36 | 0 |

Having thus described the invention, what is claimed is:

1. A process for chemically modifying wool which comprises reacting wool under essentially anhydrous conditions, in the presence of N-methyl-2-pyrrolidone, with an organic isocyanate of the class consisting of aliphatic, aromatic, and aromatic-aliphatic isocyanates.
2. The process of claim 1 wherein the organic isocyanate is an aryl isocyanate.
3. The process of claim 1 wherein the organic isocyanate is phenyl isocyanate.
4. The process of claim 1 wherein the organic isocyanate is o-chlorophenyl isocyanate.
5. The process of claim 1 wherein the organic isocyanate is m-tolyl isocyanate.
6. The process of claim 1 wherein the organic isocyanate is 3,5,3',5'-bixylylene-4,4'-diisocyanate.
7. The process of claim 1 wherein the organic isocyanate is an aliphatic isocyanate.
8. The process of claim 1 wherein the organic isocyanate is octadecyl isocyanate.

References Cited in the file of this patent
UNITED STATES PATENTS

| | | |
|---|---|---|
| 1,875,452 | Hartmann | Sept. 6, 1932 |
| 2,880,054 | Moore | Mar. 31, 1959 |
| 2,888,313 | Mautner | May 26, 1959 |
| 2,965,584 | Elkin | Dec. 20, 1960 |
| 2,974,003 | Koenig | Mar. 7, 1961 |
| 3,007,763 | Adams | Nov. 7, 1961 |
| 3,040,002 | Aldridge | June 19, 1962 |

FOREIGN PATENTS

| | | |
|---|---|---|
| 540,613 | Great Britain | Oct. 23, 1941 |
| 586,549 | Great Britain | Mar. 24, 1947 |